United States Patent [19]

Luchetti

[11] Patent Number: 4,543,878

[45] Date of Patent: Oct. 1, 1985

[54] HEAT EFFICIENT COOKING APPARATUS

[75] Inventor: Lorenzo Luchetti, Terni, Italy

[73] Assignee: Interimport F. Caceffo GmbH, Bielefeld, Fed. Rep. of Germany

[21] Appl. No.: 570,333

[22] Filed: Jan. 13, 1984

[30] Foreign Application Priority Data

Oct. 3, 1983 [IT] Italy .............................. 66711 A/83

[51] Int. Cl.$^4$ ............................................. A47J 27/04
[52] U.S. Cl. ...................... 99/330; 99/355; 99/407; 99/426; 426/507
[58] Field of Search ................ 99/403, 404, 407, 330, 99/352, 355, 426; 426/523, 402, 462, 507; 126/20, 20.1, 20.2

[56] References Cited

U.S. PATENT DOCUMENTS

| | | | |
|---|---|---|---|
| 1,679,099 | 7/1928 | Smith | 426/507 |
| 2,227,634 | 1/1941 | Dalin | 426/507 |
| 2,909,114 | 10/1959 | Bok | 99/355 |
| 3,561,347 | 2/1971 | Ellis | 99/352 |
| 3,937,135 | 2/1976 | Pratolongo | 99/352 |
| 4,181,072 | 1/1980 | Hirahara | 99/404 X |
| 4,387,630 | 6/1983 | Timbers | 99/355 X |

*Primary Examiner*—Billy J. Wilhite
*Attorney, Agent, or Firm*—Schwartz, Jeffery, Schwaab, Mack, Blumenthal & Evans

[57] ABSTRACT

The apparatus for cooking of food items, in particular, pasta, dehydrated vegetables or the like, comprises a hot water generator, a cooking chamber combined with it, a food inlet entering the cooking chamber and a separating chamber following the cooking chamber through an outlet. The separating chamber is located under the cooking chamber, so that the cooked food items drop into the separating chamber following the completion of the cooking process. The cooking chamber, the hot water generator connected with it and the separating chamber form a coherent, compact unit.

8 Claims, 1 Drawing Figure

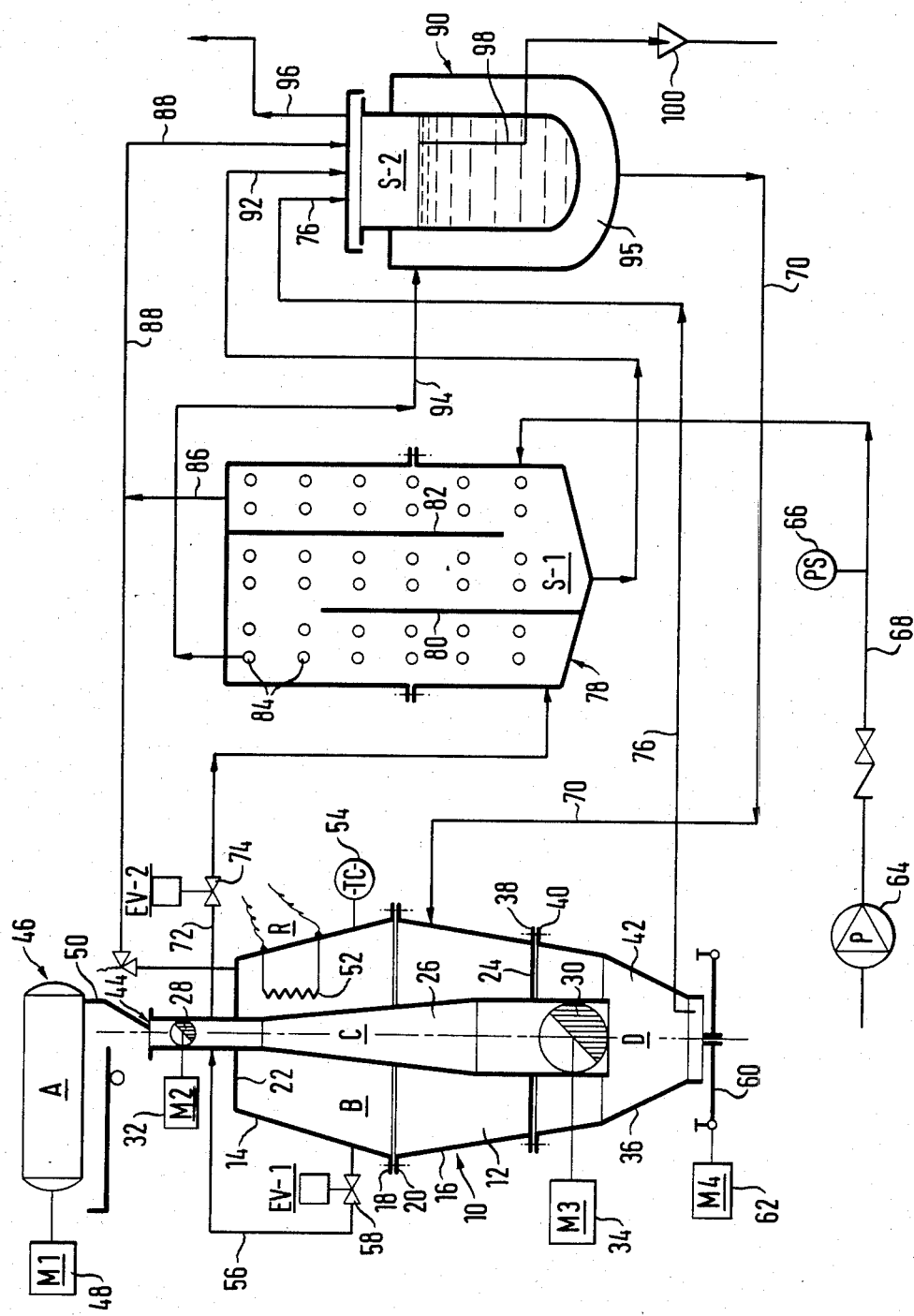

HEAT EFFICIENT COOKING APPARATUS

BACKGROUND OF THE INVENTION

The present invention relates to an apparatus for cooking foods, in particular pasta, dehydrated vegetables or the like, and more particularly to such an apparatus which includes a hot water generator, a cooking chamber connected with the hot water generator, a food inlet entering the cooking chamber and a separating chamber following the cooking chamber through an outlet.

In restaurants, especially fast food restaurants, or when serving hot food in automats, it is of special importance to have the food available as rapidly as possible and without the time requirements of a conventional cooking process. This is true, for example, for the preparation of food items, such as pasta, in particular spaghetti, rice, dehydrated vegetables and the like. From DE-OS No. 22 47 071 and U.S. Pat. No. 3,937,135 (essentially corresponding to DE-OS No. 22 47 071), an installation of this type is known whereby the aforementioned foods are cooked with pressurized water in a short period of time. The maintenance of excess pressure on the water in this known installation leads to an acceleration of the cooking process and prevents the water from passing into steam, so that the food remains completely covered with water during cooking. This is necessary in order to obtain a controlled, uniform cooking of the food items.

In the known apparatus, the hot water generator, the cooking chamber and the separating chamber are separate units which are arranged adjacent to each other and are interconnected by conduits. This requires a substantial volume of space. The separating chamber, which is in the form of a vortex chamber, is located laterally with respect to the cooking chamber. The transport of the food from the cooking chamber to the separating chamber is effected merely by the pressure impact resulting from the opening of a valve located between the cooking chamber and the separating chamber following a cooking process. It is therefore possible that food remains in the cooking chamber or the connecting line. The steam generated by the pressure drop caused by the opening of the cooking chamber is released to the environment.

As with the hot water generator, the cooking chamber and the separating chamber are arranged separately, and the steam generated is discharged from the separating chamber to the environment. Thus, there is a considerable loss of energy and the apparatus has high energy, requirements. The heat requirement aspect is especially important when the apparatus is used at large time intervals only and is permitted to cool down completely in the meantime.

SUMMARY OF THE INVENTION

It is an object of the present invention to provide an improved apparatus for cooking food items.

Another object of the present invention is to provide a food cooking apparatus which operates rapidly, reliably and in an energy saving manner.

A further object of the present invention is to provide a food cooking apparatus which may be manufactured in a compact form.

In accordance with the above and other objects there has been provided in accordance with the present invention an apparatus for the cooking of food items, in particular, pasta, dehydrated vegetables or the like, comprising a hot water generator, a cooking chamber combined with the hot water generator and a separating chamber connected to the cooking chamber through an outlet. The separating chamber is arranged below the cooking chamber, and the cooking chamber, the hot water generator and the separating chamber, form a coherent unit.

In accordance with other preferred aspects of the invention, the cooking chamber has an upper end equipped with a valve, and a food inlet is connected to the upper end. The cooking chamber has a lower end having a further valve, and the lower end opens into the separating chamber through the further valve.

The invention preferably includes a common housing having upper and lower parts, and a horizontal partition. The hot water generator and the separating chamber are arranged in the upper and lower parts, respectively, of the common housing on either side of the horizontal partition. The cooking chamber comprises an essentially cylindrical, vertical tube mounted within the hot water generator. The hot water generator has an upper cover plate and the vertical tube protrudes upwardly through the upper cover plate. The bottom of the vertical tube opens under the horizontal partition within the separating chamber.

The cooking chamber may flare outwardly within the hot water generator in the downward direction in the form of a truncated cone.

BRIEF DESCRIPTION OF THE DRAWING

The above and other objects will become more readily apparent as the invention becomes more fully understood from the detailed description to follow, reference being had to the accompanying drawing which shows a schematic representation of the present invention.

DETAILED DESCRIPTION OF THE PREFERRED EMBODIMENTS

The present invention is a cooking installation having a separating chamber arranged under a cooking chamber, wherein the cooking chamber forms a coherent unit with a hot water generator connected with it and the separating chamber.

The cooking chamber is arranged over the separating chamber so that after completion of the cooking process, the cooked food items are reliably transferred into the separating chamber by gravity as well as by the difference in pressure between the cooking chamber and the separating chamber. It is not necessary that the cooking chamber and the separating chamber be placed in an exactly vertical manner above each other, they merely should be located in planes located over each other.

The combination of the hot water generator, the cooking chamber and the separating chamber in a single unit leads to a reduction of the loss of energy and to a shortening of the processing time due to the shorter transport path of the food items.

According to a preferred embodiment of the invention, the food inlet is located on the upper side of the cooking chamber, so that the food may be moved continuously from top to bottom, using the force of gravity.

In a particularly advantageous embodiment, the hot water generator and the separating chamber are located in the upper and lower part, respectively, of a housing separated by a horizontal partition, while the essentially tubular cooking chamber enters the hot water generator concentrically from above, passes through the partition and has an outlet opening in the separating chamber. Valves or flaps are located in the area of the food inlet and the outlet. Hot water may be introduced over the shortest possible path into the cooking chamber from the hot water generator surrounding it.

The cooking chamber flares out inside the hot water generator preferably in the form of a truncated cone. The housing containing the hot water generator and the separating chamber consists preferably, from top to bottom, of three truncated sections, the uppermost whereof flares out in the downward direction, while the two others converge downwardly. In the area of the joint, outwardly projecting flanges may be provided to secure the sections to each other.

A pump is preferably provided, which maintains the water in the hot water generator at a predetermined excess pressure. This water may initially be conducted through one or two heat exchangers which are traversed in a counter current manner by the steam derived from the cooking chamber and the separating chamber.

Referring to the drawing, on the left hand side of the drawing, a housing 10 is shown. The upper part of housing 10, designated by the letter B, forms a hot water generator 12. The portion of housing 10 which forms the hot water generator 12 comprises two sections 14, 16. Section 14 is positioned above section 16. Sections 14 and 16 converge upwardly and downwardly, respectively, in the manner of truncated cones and are joined together by outwardly projecting flanges 18, 20. The upper section 14 is closed on top by a cover plate 22 and lower section 16 on the bottom by a horizontal partition 24.

A tube flaring out downwardly in the form of a truncated cone passes concentrically through the upper cover plate 22, the entire hot water generator and the lower partition 24, thereby forming the cooking chamber 26. Over the upper cover plate 22 and under the lower partition 24, valves 28, 30 are located in the tube forming the cooking chamber 26. Valves 28, 30 may be in the form of flaps, slides, ball valves or the like and have electric servomotors 32, 34 associated with them. The servomotors are designated M2 and M3. The function of these valves and servomotors will be explained in detail hereinafter. The cooking chamber proper is located between the valves, in an area designated C.

Under the lower partition 24 of the hot water generator, the housing 10 has a further section 36 converging downwardly in the shape of a truncated cone, in two segments. Section 36 is joined with the lower segment 16 of the hot water generator by outwardly projecting flanges 38, 40. The lower section 36 forms a separating chamber 42, designated D.

The upper, open end of the tube forming the cooking chamber 26, in which the valve 28 is located, represents the food inlet 44. A supply installation 46 (A) (not shown in detail) over the food inlet 44 is equipped with a servomotor 48 (M1). Servomotor 48 actuates the supply installation to effect the transport of a portioned amount of food over a chute 50, into the food inlet 44.

A schematically indicated electric resistance heating device 52 (R) heats the water in the hot water generator and is controlled with the aid of a thermostat 54 (TC) to keep the water temperature in the range of 120°-180°.

The hot water generator 12 is connected with the cooking chamber 26 by a line 56, wherein an electromagnetic valve 58 (EV-1) is located. The position of line 56 is represented to be external of housing 10 for the sake of clarity, but may extend over the shortest distance between the hot water generator and the cooking chamber.

Under the separating chamber 42 there is a swivelling closure 60, which may be actuated by means of a servomotor 62 (M4).

Fresh water is supplied to the hot water generator 12 by a pump 64. Pump 64 takes water from a water supply system and delivers it under the effect of a pressure control valve 66 (PS) through the lines 68, 70 to the hot water generator. The pressure in the hot water generator is adjusted by the pressure control valve 66 to 6 to 15 bar.

Steam is released from the cooking chamber 26, following the completion of a cooking process, through a line 72 equipped with an electromagnetic valve 74 (EV-2). The water intermixed with the finished food items is removed through a line 76 in the separating chamber 42.

According to the invention, the water supplied to the hot water generator 12 by the pump 64 is preheated, using the residual energy of the steam or hot water released from the separating chamber and the cooking chamber. This is effected in the embodiment shown by two heat exchangers, the function of which shall be set forth below.

The steam from the cooking chamber 26 flows through the line 72 and the valve 74 into a first heat exchanger 78 (S-1), which is divided labyrinth-like by the partitions 80, 82. On the other side, the cold water supplied by the pump 64 through the line 68 enters a system of pipes 84 arranged within the heat exchanger. As the water in pipes 84 is heated, the steam from the line 72 is largely condensed to water. Any remaining steam passes through the lines 86, 88 to a second heat exchanger 90 (S-2), while the condensate water is also conducted to this heat exchanger 90. Finally, the heat exchanger 90 receives the hot water coming from the separating chamber 42 through the line 76.

From the piping system 84 of the first heat exchanger 78, the preheated water transported by the pump 64 is passed through a line 94 in the jacket 95 of the second heat exchanger 90. The fresh water is further heated and finally flows through the aforementioned line 70 to the hot water generator 12.

The apparatus according to the invention operates in the following manner.

When the machine is actuated, the water within the hot water generator 12 is heated within a period of time of, for example, 15 minutes to a predetermined temperature set on the thermostat 54, within the range of 120° to 180° C. The pump 64 adjusts the water pressure by means of the pressure control valve 66 to between 6 to 15 bar. The apparatus is now in the ready condition. When a portion of a food item desired is to be delivered, a corresponding switch or push button is actuated. The supply installation 46 delivers a portion of the untreated food through the food inlet 44 to the cooking chamber 26, the lower valve of which is closed. Subsequently, the upper valve 28 is closed and hot water is introduced from the hot water generator 12 through the valve 58 and the line 56 into the cooking chamber 26. With the valve 58 open, the pump 64 adjusts the water pressure in keeping with the values desired. The pump deactivates itself and the valve 58 is closed.

When the portion of the food is cooked, the valve 74 in the line 72 opens and the steam forming in the cooking chamber is released through the line 72 into the heat exchanger 78 to obtain the proper conditions of pressure. A certain excess pressure may, however, remain in the cooking chamber 26. The valve 30 is opened and the cooked food drops into the separating chamber 42 and remains on the lower closure 60. From here, the water intermixed with the cooked food is conducted through the line 76 into the second heat exchanger 90. After the food has been adequately dried, the closure 60 is opened by the servomotor 62 and the food drops onto a plate or the like (not shown) arranged under it. Makings and spices may be subsequently added, automatically or by hand.

The fresh water introduced by the pump 64 is continuously placed in a heat exchange relationship with the steam and hot water discharge in the heat exchangers 78, 90 and preheated. In a deviation from the embodiment described, the fresh water may be heated initially in the heat exchanger 90 and then in the hotter heat exchanger 78, so that a counter current principle is applied. By the exchange of heat, the water introduced in the hot water generator 12 is already preheated so that the resistance heater 52 must provide only a limited increase in the temperature. This results in a considerable savings of energy.

A further savings in energy is obtained by the compact configuration of the hot water generator 12, the cooking chamber 26 and the combustion chamber 42. As the cooking chamber 26 is arranged according to a preferred embodiment inside the hot water generator 12, it is always at a relatively high temperature following the attainment of the state of readiness, so that it is not necessary to heat it up during each cooking process by the hot water introduced. Provided its mantle surfaces are suitably insulated, the hot water generator 12 may always be maintained at the temperature desired, with a relatively low heat output of the resistance heater 52.

A heat outlet 96 for any residual steam is provided on top of the heat exchanger 90 shown in the drawing. An overflow 98 maintains the water within the heat exchanger at a constant level and discharges the excess water through a water drain 100.

The heat exchangers 78, 90 and the associated piping system may be laid out in a considerably more compact manner than the expanded configuration shown in the drawing for the sake of clarity, and in particular may be placed directly onto the housing 10.

The foregoing description is set forth for the purpose of illustrating the present invention but is not deemed to limit its scope. Clearly, numerous substitutions, additions and other changes may be made to the invention without departing from the scope thereof, or set forth in the appended claims.

I claim:

1. An apparatus for cooking food items, in particular pasta, dehydrated vegetables or the like, comprising:
    a common housing having an upper and a lower part;
    a horizontal partition for separating the upper and lower parts of the common housing;
    a hot water generator arranged in the upper part of the common housing;
    an upper cover plate for the hot water generator;
    a separating chamber arranged in the lower part of the common housing; and
    a cooking chamber having a food inlet and a food outlet, and including an essentially cylindrical, vertical tube, wherein the vertical tube protrudes upwardly through the upper cover plate, and opens under said horizontal partition within the separating chamber.

2. An apparatus according to claim 1, wherein the cooking chamber flares out within the hot water generator in the downward direction in the form of a truncated cone.

3. An apparatus according to claim 1, including a thermostatically controlled electrical heater arranged in said hot water generator and a supply line for fresh water connected to said hot water generator, and a pump with a pressure control valve being arranged in said line.

4. An apparatus according to claim 3, including lines for the discharge of steam and hot water from the cooking chamber and the separating chamber, said discharge lines leading to at least one heat exchanger, wherein an exchange of heat with the fresh water supplied by the pump through the supply line for the hot water generator takes place.

5. An apparatus according to claim 1, including a metering and supply device for raw food items arranged over said food inlet.

6. An apparatus according to claim 1, wherein said separating chamber has a bottom in the form of a closure comprising two pivoting flaps.

7. An apparatus according to claim 1, including a line with a valve connecting the hot water generator and the cooking chamber.

8. An apparatus according to claim 1, further comprising an upper end for said cooking chamber; a first valve for connecting said food inlet with said upper end; a lower end for said cooking chamber opening into said separating chamber; and a second valve for connecting the lower end with the cooking chamber.

* * * * *